May 21, 1968 L. ORNSTEIN ET AL 3,384,564
ELECTROPHORETIC PROCESS FOR SIMULTANEOUSLY SEPARATING
AND CONCENTRATING PARTICLES
Filed Nov. 21, 1962 3 Sheets-Sheet 2

INVENTOR.
LEONARD ORNSTEIN
BY BARUCH J. DAVIS

ATTORNEY

United States Patent Office 3,384,564
Patented May 21, 1968

3,384,564
ELECTROPHORETIC PROCESS FOR SIMULTANE-
OUSLY SEPARATING AND CONCENTRATING
PARTICLES
Leonard Ornstein, White Plains, and Baruch J. Davis, New York, N.Y., assignors to Mount Sinai Hospital Research Foundation, Inc., New York, N.Y., a membership corporation of New York
Filed Nov. 21, 1962, Ser. No. 239,177
21 Claims. (Cl. 204—180)

This invention relates to new and useful improvements in electrophoretic separation and more particularly seeks to provide a simultaneous separation and concentration of charged particles which may be either separately recovered or alternatively the resulting contiguous thin zones of charged particles used thereafter as the starting zones with appropriate pH and/or pore size change for high resolution and further separation of the components in brief runs.

Although electrophoresis is one of the most effective methods for the separation of charged components of a mixture, the resolving power of different electrophoretic methods is quite variable. To separate two component ions in zone electrophoresis, it has been necessary heretofore to permit migration to continue until one component has travelled at least one thickness of the initial volume (starting zone) further than another component. This is to be contrasted with moving boundary electrophoresis which is analytical rather than preparative in that the leading boundaries are separated but the bulk of the trailing zones of the various ions are still mixed.

One of the primary problems in zone electrophoresis, where components may, in contrast be completely separable, is the sharpness or resolution of the zones occupied by each component which diminishes with time because of the spreading of the zones as a result of diffusion. Thus separation and diffusion work against each other and generally require a compromise as to the separation time and voltage gradient selected by the operator.

Electrophoresis to separate charged components in a liquid medium or on paper (or granular matrix) has been known for many years and has been used in research work but has never become a routine diagnostic tool because of many disadvantages. Remarkable resolution and a possible improvement in analytical duplication has been achieved by using frictional properties of gels, such as starch gel and polyacrylamide gel as the medium in which electrophoresis occurs. Even here, however, there has not heretofore been found a satisfactory analytical method that can be easily duplicated from one operator to another.

Two striking differences characterize the behavior of proteins during separation by zone electrophoresis in gels when compared to their behavior during paper or moving boundary electrophoresis. Firstly, the measured mobilities of components are different in magnitude, and sometimes even the order of mobilities changed. Secondly, more fractions may be resolved in gels and the zones are usually narrower than in paper or free electrophoresis for equal spacing from the origin and for equal running times. These differences are due to the unique viscous properties (relative to moving charged particles) of gels and solutions of very long chain polymers. A particle moving through a gel experiences a frictional resistance which is a complex function of the particle's diameter. The viscosity of a gel is low (i.e. particles move fast under a small applied force) when the diameter of the particles is small compared to the average pore of a gel, but the viscosity is virtually infinite when the diameter is very large compared to the pore size.

Thus with a synthetic polymer like polyacrylamide, because the average pore size of a gel depends on the concentration of polymer (e.g., a 30% gel produces about a 20 Angstrom pore and 7½% about 50), the pore size can be adjusted to the range of dimensions of the molecules to be separated. Table 1 gives the dimensions in Angstroms and the free mobilities of a few plasma proteins at pH 8.6 (mobility unit=$10^{-5}$ cm.$^2$/volt-sec.):

TABLE 1

| Protein | Mobility | Molecular Weight | Length | Diameter |
|---|---|---|---|---|
| Albumin | −6.1 | 69,000 | 150 | 38 |
| Transferrin | −3.3 | 90,000 | 190 | 37 |
| $\beta_1$ Lipoprotein | [1]−3.0 | 1,300,000 | 185 | 185 |
| $\gamma$ Globulin | [1]−1.0 | 156,000 | 235 | 44 |
| Fibrinogen | −2.1 | 400,000 | 700 | 38 |
| $\alpha_2$ Macroglobulin | −4.2 | 850,000 | | |

[1] Approximate.

Figure 5:
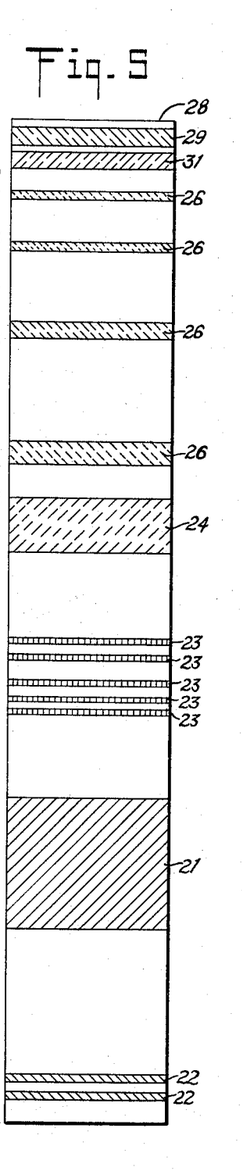
FIG. 5 is a diagrammatic view enlarged axially of the spaced zones of FIG. 3.
Figure 6:
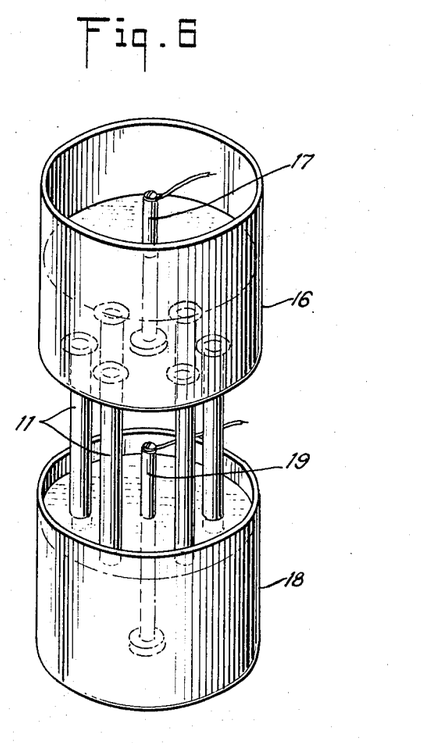
FIG. 6 is a perspective view of apparatus designed to handle a multiplicity of electrophoretic samples simultaneously.

It would appear that a 7½% aqueous polyacrylamide should exhibit extreme frictional resistance to the migration of fibrinogen, $\beta_1$ lipoprotein (and perhaps the $\alpha_2$ macroglobulin and $\gamma$ globulin), and that the other proteins should be able to pass through, though with substantially more difficulty than in a simple aqueous system and this is demonstrated in FIG. 5. Thus differences in molecular size as well as charge can be utilized in electrophoretic separation of various components in a gel or solution of linear polymer.

It is an object of this invention to separate and concentrate charged components into contiguous thin discs within an electrophoretic system with the total thickness of the zone occupied by all components being considerably less than the thickness of the initial volume of the mixture.

It is an added object of this invention as a second automatic step in a second region of the electrophoretic medium to further separate the contiguous discs of charged components from one another within a relatively short time.

It is a further object of this invention to run the charged components through a first zone of pore size relatively large compared to the dimensions of the particles and thereafter through a sieve for molecules such that the pore size of the gel appreciably affects the relative mobility of the different components.

It is also an object of this invention to provide for a pH change between two regions of medium so that the mobilities of the components may be differentially affected.

It is an additional object of this invention to provide prepared tubes of medium for electrophoresis with a very smooth face to which may be added the second of a two-stage medium and which permit consistent results between different operators.

It is one more object of this invention to provide prepared tubes of medium for electrophoresis in which the medium components have been preselected and arranged under proper conditions to insure successful separation under the processes outlined herein.

It is another object of this invention to completely separate charged components into contiguous zones before running a distance equal to the length of the starting zone.

It is an added object of this invention to provide for electrophoretic separation of components in a short period of time so as to reduce the effect of diffusion in the resolution of the resultant zones.

We have found that a wide zone of mixed charged particles may be both separated and concentrated into contiguous thinner zones in the order of their mobilities by running same in or into a medium that prevents convection and under conditions such that across each zone there is a distinct and separate voltage gradient such that each and every kind of particle of like sign of charge moves at the same speed after this first separation has occurred, and this is accomplished by arranging a pH environment whereby a weak buffer ion having the same sign of charge as the migrating components to be separated will not be present in the running zone at the completion of the concentrating and initial separating step and will have a speed at the particular pH so that it will remain behind the slowest of these migrating components. It is arranged so that these migrating components are preceded by a fast ion of same sign of charge which has a mobility larger than that of any of these components. After this separation and concentration into a stack of contiguous thin zones or discs, the components may either be physically separated (e.g., permitted to run under electrophoresis out of the column end into a prepared fraction collector), or permitted to run under electrophoresis into and then within an extended column to secure further separation of the components. This further separation will require a change of electrophoretic conditions which is accomplished by varying the media pore sizes and/or pH to establish a more linear voltage gradient throughout the region occupied by the component zones smaller than and rather than the unique voltage gradients within each component zone. A convenient way to establish such a linear voltage gradient is to change the pH of the medium to increase the relative speed of the weak buffer ion so that it overtakes and passes at least all the migrating components to be separated.

With the above objects and features in view, the nature of which will be more apparent, the invention will be more fully understood by reference to the drawings, the accompanying detailed description and the appended claims.

This invention as particularly illustrated shows detailed systems designed for the separation of blood serum proteins and pituitary hormone extracts but is obviously applicable to the separation of any charged components subject to electrophoretic principles, including but not limited to isotopes, water-soluble proteins and peptides such as tissue extracts of animals, plants and lower organisms, secretions (e.g., tears, salivary juices), aqueous extracts of liver, kidney, spleen and pituitary, egg white, extracts and supernatants of cultures from microorganisms, synthetic ionic polymers, and other macromolecular ions such as polynucleotides, macro-polysaccharides and small molecules such as amino acids, acids and bases.

The illustrated system takes advantage of the adjustability of the pore size of a synthetic gel, and in addition automatically produces new starting zones as thin as 10 microns thickness from initial volumes with thicknesses of the order of centimeters so that high resolution is achieved in very brief runs. With the specific version of this technique detailed in FIGS. 1–5, over twenty serum proteins are routinely separated from a sample of whole human serum as small as one microliter in a twenty-minute run (see FIG. 5). Direct analysis of even very dilute samples becomes routine because the various ions are automatically concentrated to fixed high values at the beginning of the run just prior to the separation which will then occur in a linear voltage gradient. Preliminary laboratory studies and theoretic considerations provide evidence of the applicability of this general technique to a wide range of ionic species for both analytic and large-scale preparative purposes.

We have found polyacrylamide gels to be the far better medium, as they are thermo-stable, transparent, strong, relatively chemically inert, can be prepared with a large range of pore sizes and are non-ionic, which properties are not met by any other known medium at this time. However, our invention is not limited to any particular medium, as this is applicable to any media that exhibits the desired properties described herein. For analytical separation of mixtures of proteins such as human serum proteins as negative ions, the following detailed system represents one of many variations used.

A polyacrylamide gel column (see FIG. 1) in a cylindrical container 11 is prepared in three layers, namely a large-pore gel specimen layer 12 containing the sample ions, a large-pore gel spacer-layer 13 and a small-pore gel layer 14 for further separation of contiguous zones formed when the specimen ions pass through the specimen and spacer-layers. The large-pore gels are designed to serve as anti-convection media, while the small-pore gel serves as a sieving as well as an anticonvection medium. The interface between the large-pore and small-pore gels must be flat and smooth since the shape of this surface is imprinted on the discs of sample ions as they pass through it. Electrophoresis is ordinarily performed in a vertical position, so the gel containers are attached to an upper buffer reservoir 16 with negative electrode 17 and the lower ends submerged in the lower buffer reservoir 18 with positive electrode 19.

Figure 1:
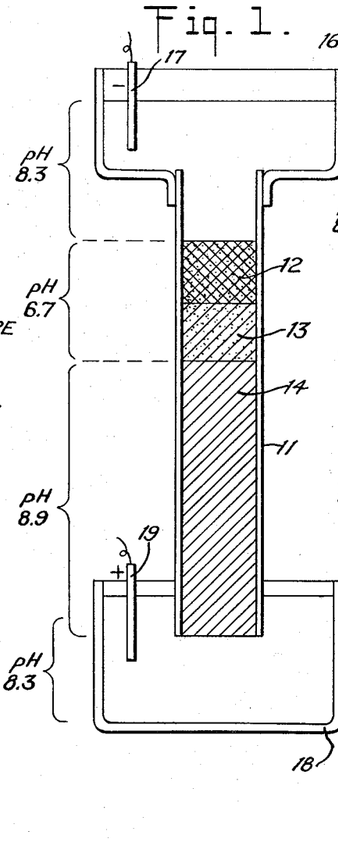
FIG. 1 is a diagrammatic cross-section of an electrophoretic system in accordance with this invention just after the addition of a blood serum sample and before applying an electric potential.
Figure 2:
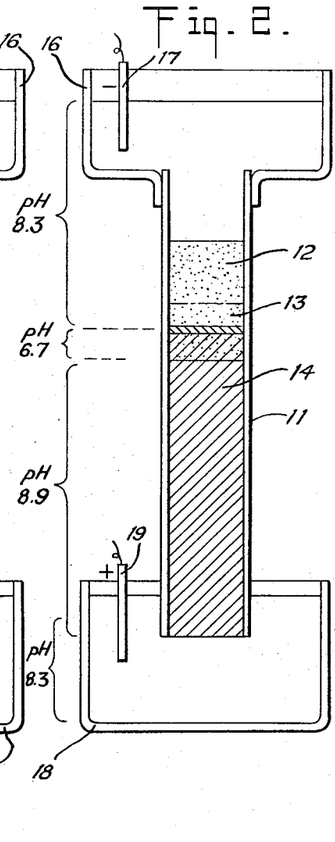
FIG. 2 shows the same system after the blood serum is concentrated and separated into a plurality of contiguous zones or discs represented diagrammatically by a thin horizontal bar.
Figure 3:
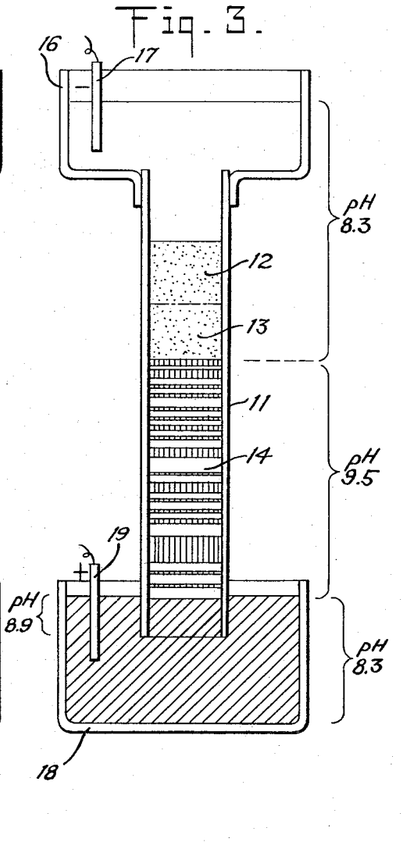
FIG. 3 shows the same system after the zones have been further separated from one another.

Containers 11 for the gel columns are cut from cylindrical glass or plastic tubing. The tubes are about 63 mm. in length and 5.0 mm. I.D. and fit snugly into the connectors at the bottom of the upper buffer reservoir. The reservoirs 16 and 18 are filled with an aqueous buffer solution prepared from 6 g. 2-amino-2-(hydroxymethyl)-1-3-propanediol, more commonly known as TRIS and 28.8 g. of glycine per liter giving a pH of 8.3.

A first stock solution A of 48 cc. of 1 normal HCl, 36.6 g. TRIS, and 0.46 cc. of N,N,N',N'-tetramethylethylenediamine made to 100 cc. with $H_2O$ and with a resulting pH of 8.9 is prepared. A second stock solution B of 30 g. acrylamide, 0.8 g. N,N'-methylenebisacrylamide and 15 mg. potassium ferricyanide $[K_3Fe(CN)_6]$ made to 100 cc. with $H_2O$ is prepared. A third stock solution C of 0.14 g. ammonium persulfate $[(NH_4)_2S_2O_8]$ per 100 cc. of $H_2O$ is also prepared. The containers 11 are vertically mounted in rubber caps. They are then filled to within ½″ of the top with a thoroughly mixed small-pore solution of 1 part A, 2 parts B, 1 part $H_2O$ and 4 parts C having a pH of 8.9. This solution is overlaid carefully with ¼″ of distilled $H_2O$ and a sharp refractile boundary appears at the interface. The tubes stand undisturbed for 40 minutes at room temperature for the gel to form. The original refractile line disappears by diffusion but another parallel to the first appears about 3 mm. below between 20 and 30 minutes later, marking the junction between a clear transparent gel polymer and oxygen-inhibited monomer and producing the required flat and smooth surface.

The rate of polymerization is directly related to temperature, and for this reason the gel reagent solutions should be allowed to come up to room temperature before using. Minor variations in gelation time dependent on temperature may be compensated by adjusting the concentration of potassium ferricyanide (inhibitor). At the end of 40 minutes the water and unreacted monomer solution are removed by inverting the tubes and gently shaking and draining, leaving small-pore layer 14.

A fourth stock solution D of 48 cc. of 1 normal HCl and 5.98 g. of TRIS made to 100 cc. with $H_2O$ and with a resulting pH of 6.7 is prepared. A fifth stock solution E of 4.0 mg. riboflavin per 100 cc. $H_2O$ is prepared. A sixth solution F of 10 g. of acrylamide, 2.5 g. N,N'-methylenebisacrylamide made to 100 cc. with water is prepared. A large-pore solution is formed of 1 part D, 1 part E, 2 parts F and 4 parts $H_2O$ having a pH of 6.7.

The unfilled portions of the tubes are rinsed once gently without delay with the large-pore solution. About a ⅜-in. column of large-pore solution is added to the tubes and a ⅛-in. column of distilled water again overlaid. A 15-watt daylight fluorescent lamp is placed behind the gel tubes. The bulb is set at about the same level as that of the tubes, parallel to the line of tubes and about 3 inches away. After about 5 minutes of exposure to the light, the clear solution becomes increasingly opalescent indicating gel formation. Total photopolymerization time is about 15 minutes.

For a high level of reproducibility, the average pore size of the small pore gel must be very uniform, from tube to tube. On the other hand, since the slight sieving properties of the large pore gel play no critical role in the concentrating step, close control of pore size there is not critical.

Chemically catalyzed (persulfate initiated) monomer solutions more easily yield a uniform polymer in repeated polymerizations but requires that the initiator (e.g., the persulfate) be added a short while before forming the gel. Photopolymerization (e.g., using riboflavin as the photocatalyst), while producing a somewhat less uniform gel unless light intensities are carefully controlled, permits the use of a more convenient stock solution which can be premixed even weeks before use if stored in a brown bottle or in the dark. This explains the reasons for the use of the two different methods of polymerization in this particular process.

The small pore gel may be packaged in tubes 11 and sold separately for addition of the large-pore gel and specimen by the operator. It is very important for comparing work from one operator to another and also to secure a good separation that the small-pore gel surface adjacent the large-pore gel (1) be perpendicular to the long axis within 5° of arc and (2) must not depart from planarity more than 0.25 mm. The method described herein will produce a surface well within these tolerances.

Following photopolymerization of this large-pore spacer layer 13, the water layer is decanted and a mixture containing about 0.15 ml. of large-pore solution and 3 microliters of a serum sample (about 200 gamma of protein) is added to each tube after thorough but gentle mixing, forming the specimen layer 12 about ⅜" in depth. The total amount of protein in the sample volume should not usually exceed 200 gamma. A tuberculin syringe fitted with a length of small-bore polyethylene tubing serves as a useful device for measuring, mixing and delivering the sample volume solution into the tubes. The short-length column of fluid in the tubing provides an easily measured and fairly reproducible volume in the microliter range. No water layer is added. The solutions are photopolymerized in the manner just described for 20 minutes.

If a more dilute protein sample is used (i.e., a protein concentration down to 0.2 mgm. percent), a more concentrated large-pore solution is prepared and the final gel solution is made by dilution with the protein sample. If the concentration of the protein is less than 0.2 mgm. percent, the volume of the sample gel is increased to accommodate an amount of protein mixture equal to about 200 gamma and the column height of the spacer gel is increased proportionately. In order to prevent inhibition of polymerization, the concentration of serum in the sample gel should usually not exceed ⅟₅₀ V./V.

When polymerization is completed, the gel tubes are removed from the rubber caps by tilting a tube in such a fashion as to prevent the formation of a vacuum at the base which might momentarily deform the gel sufficiently to displace it from the wall of the container.

Electrophoresis is preferably started at least within 1 hour after the spacer gel has been prepared. The tubes 11, sample gel uppermost, are inserted into the grommets of the upper buffer reservoir 16 and this reservoir filled with about 200 ml. of the TRIS-glycine buffer previously diluted to ⅟₁₀ strength with water. One ml. of 0.001% Bromphenol Blue in water is stirred into the upper buffer. Any air spaces in the gel tubes above the sample gel are filled with buffer by means of a pipette. Next a hanging drop of buffer is placed on the bottom of each tube to prevent trapping of bubbles and the upper reservoir is then lowered so that the bottoms of the tubes are immersed about ¼" in the buffer (also ⅟₁₀ strength) of the lower reservoir. The lower reservoir 18 should be filled to within ½" of the top. The power supply is connected to cathode 17 to the upper reservoir.

We now have (see FIG. 1) before the potential is applied, a pH of 8.3 in both buffer reservoirs, a pH of 8.9 in the small-pore zone, and a pH of 6.7 in the large-pore zones inclusive of the specimen and spacer zones. Chloride and TRIS are present throughout the tube, the protein sample occupies the specimen zone and glycine is absent from the gel zones in the tubes. However, the chloride is in equal amounts but there is more than 6 times the concentration of TRIS in the small-pore zone than in the large-pore zone. A 150 volt potential (at 5 milliamperes current per tube) is turned on, causing TRIS to migrate upwardly and glycine downwardly through the tube.

At pH 8.3, the glycine migrates slower than the slowest protein component of the blood serum. Without glycine within the migrating span of the blood serum, each specific protein develops a separate voltage gradient which forces that component to concentrate into thin discs contiguous to other components and in the order of their relative mobilities.

Figure 4:
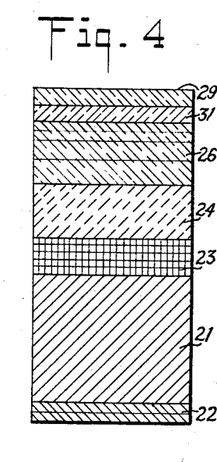
FIG. 4 is a diagrammatic view enlarged axially of the contiguous zones of FIG. 2.

The term "force" is here used loosely. The accompanying theoretical equations show how, under the carefully chosen conditions of this process, the inherent relations of the electrochemical laws will thus constrain the component ionic species to behave in this way. These equations also explicitly provide the basis for calculating the exact concentrations of the critical components (e.g., in this case, of chloride, glycine, and tris in the buffer, large pore, and small pore gels) in order to insure that these chosen conditions will be fulfilled. Within a very short time, the components of the specimen will be completely separated in discs such as seen in FIG. 4.

The current is preferably adjusted to about 2 to 5 mils per tube. Current may be adjusted by diluting the stock buffer or by controlling the applied voltage. Currents higher than 5 mils per tube should be avoided since excessive ohmic heating may result in artifacts. When runs are performed in the cold, 1° to 15° C., to reduce enzyme inactivation, the current is reduced to about 1 mil per tube and the running time is increased to about 2 hours.

On applying a voltage, a thin disc of bromphenol blue is seen to migrate into the gels. It overtakes and passes the protein species which concentrate behind the dye as it migrates through the sample and specimen gels.

Concentration of the proteins is completed in the lower end of the spacer gel. At this point the proteins are visible as thin refractile bands immediately preceded by the dye band. On entering the small-pore gel, the proteins are separated from one another as well as from the free dye. The separating proteins can often be seen as thin refractile bands. Since albumin binds bromphenol blue, the albumin band is blue. The free dye, blue red in color, precedes the albumin.

Electrophoresis is performed for about 25 minutes or until the front of the albumin has migrated about 25 mm. into the small-pore gel. At the completion of the run the free dye has become separated from the albumin by a distance of about 6 mm. At the completion of electrophoresis, after the power supply is turned off, the buffer solutions are decanted. (Most of the chloride will have migrated into the lower reservoir 18 in FIG. 3 as shown but it will be greatly diluted (not shown) because of the volume difference. A slight amount of chloride (not shown) will also have migrated into the lower reservoir in FIG. 2. If a few tubes are run, the buffer solutions can be reused but the upper and lower buffer solution must not be pooled nor positions reversed in the apparatus.) The gel tubes are removed from the upper reservoir and the gels removed from the tubes by rimming under water. This lubricates the gel surface and prevents mechanical damage to the gel by the rimming wire or needle.

The needle is introduced into the bottom end of the tube between the small-pore gel and the tube wall for a distance of several millimeters while rotating the tube. The needle is then withdrawn with a slight pressure against the gel, stretching the gel so that it will protrude about 5 mm. beyond the end of the tube. The needle is then withdrawn completely, introduced into the other end and a continuous rimming action again applied as the needle advances. The gel will then slip out of the tube.

Each gel is placed in a test tube containing about 2 mil. of fixative-stain solution of 800 mg. of Amido Schwarz 10B in 100 ml. of 7% aqueous acetic acid for about 1 hour. At the end of 1 hour the fixative-stain solution is decanted and the gels rinsed for a few minutes in a wash solution of 7% aqueous acetic acid.

Electrophoretic destaining is performed in the same apparatus. The gels, sample gel uppermost, are placed in the destaining tubes. The gels slide down in the tubes and should wedge firmly against constricted ends of these tubes. In order to reduce convective disturbances and backflow of free dye up the tube, polyacrylamide solution for destaining (a linear solution used here without any crosslinking substance) is added to each tube by means of a pipette. No air bubbles should remain in the tubes after filling with the polyacrylamide solution. About 200 to 300 ml. of 7% acetic acid are then added to each reservoir. The electrodes are connected, cathode to the upper reservoir. The unbound dye migrates down the gels and into the lower reservoir.

Destaining is completed in about 1 hour, using a 150 volt, 1 ampere power supply. This time can be reduced to about 20 minutes if the current is increased to about 15 mills per tube by using a higher voltage. At the completion of destaining the power supply is shut off, the wash solutions are decanted and the gels are transferred to small test tubes containing 7% acetic acid.

With the disclosed specimen of normal adult human serum being electrophoresed, an average of 20 to 22 protein bands (see FIG. 5), depending in part upon genotype and physiological state, are visible after staining with Amido Schwarz dye. The most prominent fraction is albumin 21. Ahead of it are seen one or two prealbumins 22 and behind it some two to five postalbumins 23. Approximately halfway between the origin and the albumin is a moderately prominent transferring fraction 24. Between the transferring band and the origin are a number of fractions including the haptoglobins 26, which may be visualized during the run by virtue of a pink color if hemoglobin is added to the specimen prior to the run. Genetic differences in the haptoglobins which occur, can therefore be recognized. Most if not all of the gamma-globulins (excluding for example the high molecular weight 19S gamma-globulins) are found in the area occupied by the haptoglobins. At least part of the gamma-globulins present in this area is not resolved as separate discs but appears as a diffuse background stain. Also noted near the origin 28 is $\beta_1$ lipiprotein 29 and $\alpha_2$ macroglobulin 31.

Although the concentration and separation of blood serum proteins have been described here in great detail as to such conditions as pH, specific media, pore size of the media, buffers, applied potential, other ions and positive or negative charges on the migrating ions, it will be obvious to those in the electrophoretic art that these may all be varied widely. Thus positive charge particles will behave in the same manner if appropriate changes are made in buffer and pH.

The pH is very important in establishing relative speeds of the migrating ions. pH 6.7 for the large-pore gel and pH 8.9 for the small-pore gel have been chosen to assure that as the glycine front moves through the large-pore gel, the pH behind it will remain at 8.3 but on passing into the small-pore gel, the pH behind the glycine front will abruptly rise to 9.5 and thereafter remain at that value in the region behind the moving glycine front, back to the interface between the small- and large-pore gels. In the instant case, the pH change from 8.3 to 9.5 when passing from the spacer zone to the further separator zone is at a pH range where little change occurs in the speed of the constituent ions of the blood serum, but the glycine travels slower than any blood protein component at pH 8.3 and travels faster than any such component at pH 9.5. Depending somewhat on the components to be separated and other variable conditions, a choice of buffer and pH range can be made so as to satisfy the particular components being separated.

It will also be appreciated that in the specific description, there is both a pH range and a pore size change at the boundary between the spacer-concentrator zone and the separator zone. It is optional whether to have a pore size change or not, but the pH change usually is essential. It will be apparent, of course, that the tubes 11 can be prepared in advance with a filling of the critical small-pore gel and sold to the ultimate user and thus obtain even better consistency between the work of different operators. Likewise, commercially prepared stock solutions would provide a similar advantage. Naturally, specific media and conditions would be set up for a given material to be separated.

It is also obvious that the first stage of the process, namely concentration and separation of the components into contiguous discs, may be used as an independent process per se. Thus the components at the end of this stage may be physically separated from each other by slicing or, for example, by continuing the electrophoresis into another container while exchanging containers between each disc.

For example, one could isolate pure concentrated samples of pituitary hormones directly from large quantities of extracts of pituitary glands from the slaughter houses. The thickness of each contiguous disc of sample ion, when the steady-state concentration step has been completed (somewhere in the spacer gel) is proportional to the amount of the particular sample ion in the original specimen.

Figure 7:
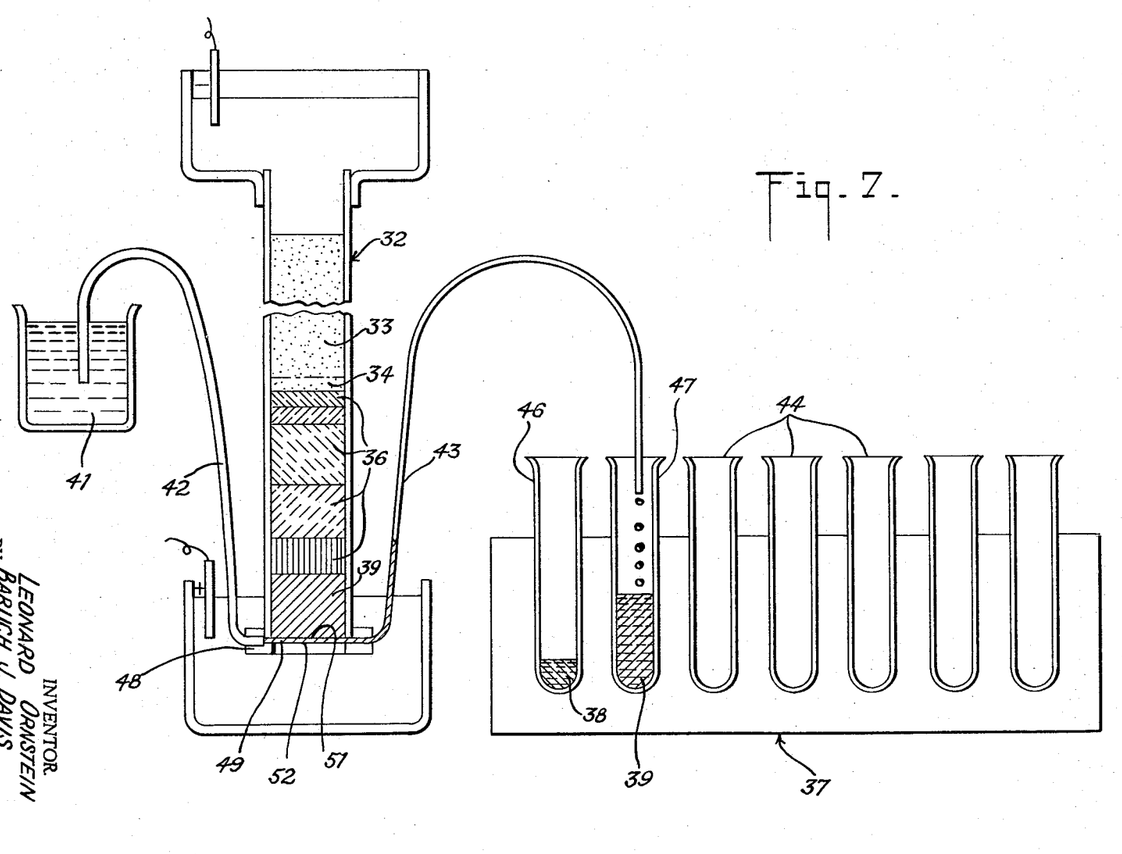
FIG. 7 is a diagrammatic cross-section of a system designed to separate gross amounts of contiguous zones of molecules in a two-stage one-medium process.

Therefore, a very large quantity of extract (e.g., a 100 cm. column 32 of any cross-section of whole pituitary extract, desalted and adjusted to about 4% protein with large-pore gel mixture) is gelled in place in a specimen zone 33 on top of a spacer zone 34 of large-pore gel and the top and bottom connected to buffer reservoirs with the glycine buffer and current passed until the leading sample ion has migrated sufficiently far that all the proteins will have stacked as discs 36, each of which will have a thickness in centimeters about equal to the percentage of the individual protein in the original extract. (FIG. 7 shows the extract after separation into discs.) These elongated discs 36 will contain pure proteins (hormones) in high concentration, and can, for example, be permitted to "electrophorese" out of the lower end of the column into an appropriate fraction collector 37.

A mesh 51 is placed at the bottom of column 32 to merely restrict the gravitational falling of materials from the column. A collector block 48 is positioned at the bottom of the column with top and bottom circular openings to hold the column and to communicate with the buffer in the lower reservoir. The block 48 has a small opening at each end for rubber tubes 42 and 43, respectively, but these openings lead into a large chamber extending throughout the block which, at the center, is at least as wide as the diameter of the column. The bottom of this chamber has a membrane 52 which permits passage of the ions of the system but not the protein particles. A chloride solution 41 is provided to flow by gravity (or other force such as a pump) through tube 42, chamber 29 and tube 43 and thus carries with it the portion of the particular protein migrating into the chamber 49 and which cannot pass membrane 52. Some chloride will pass into the collectors and some into the lower reservoir as the chloride will migrate through the membrane. Tube 43 is moved at appropriate intervals to collect each disc in a separate collector. Thus in the illustration, the first disc has been collected as material 38 in collector 46, disc 39 is partially collected in collector 47 and the remainder at the bottom of the column, whereas the five discs 36 will be collected successively in the empty collectors 44.

It is also obvious that where given conditions of electrophoresis do not adequately separate one group of components, this group may be separated from the remainder of the original mixture and that group then separated by electrophoresis under different conditions that are better designed for that particular separation.

The general mathematical concepts that are helpful in understanding this new concept will now be outlined.

Mobility

In zone electrophoresis, a sample of a mixture of ions is placed in a starting zone in a linear conducting matrix, and a potential $v$, is applied across the length $l$, setting up a potential gradient $V=v/l$, along the matrix. After a time $t$, cations will have migrated towards the cathode and anions towards the anode for distances proportional to their electrophoretic mobilities. The mobility is defined by $m=d/tV=QX/f$, where $d$ is the distance of migration of an ion in time $t$, $Q$ is the net charge of the ion, $f$ is the frictional resistance of the medium, and $X$ is a dimensionless factor which changes the effective charge of the ion and depends on the ionic environment and size of the ion.

Regulating function for weak electrolytes

The electrical conductivity $\lambda$, of a solution of ions is a function of the concentration of the $i^{th}$ ion $c_i$, its mobility $m_i$, and its elementary charge $z_i$, such that (1) $$\lambda = E\Sigma c_i m_i z_i$$

where $E$ is the charge of the electron.

If we consider acids and bases at pH's near the $pK_a$ or $(14-pK_b)$, only part of the population of molecules will be charged at any one time. If $x$ is the fraction of dissociation (i.e., the ratio of charged molecules to the sum of the charged and uncharged forms), then each molecule can be viewed as being charged $x_i$ of the time and uncharged the rest of the time. The average velocity of migration $s_i$, of the molecule in the voltage gradient $V$, will be, (2) $$s_i = V m_i x_i$$

where the product $m_i x_i$ is the effective mobility of the $i^{th}$ ion.

If two solutions, L (the lower) containing substances $\gamma$, and U (the upper) containing substance $\alpha$ (ions of $\alpha$ and $\gamma$ of like charge with $m_\gamma x_\gamma$ greater than $m_\alpha x_\alpha$), are layered U over L in a cylinder, and a potential is placed across the cylinder (from end to end), the concentration of substance in these solutions for the velocity $s_\alpha$ to equal $s_\gamma$, may be derived as follows:

Let (3) $$s_\alpha = V_U m_\alpha x_\alpha = s_\gamma = V_L m_\gamma x_\gamma$$

Since the current $Y$ through both solutions (which are electrically in series) is the same, it follows from Ohm's law that, $V_L = Y/\lambda_L S$, and $V_U = Y/\lambda_U S$; where $S$ is the cross-sectional area of the cylinder, therefore, from (1) and (3), (4) $$\frac{m_\alpha x_\alpha}{c_{i_U} m_{i_U} z_{i_U}} = \frac{m_\gamma x_\gamma}{c_{i_L} m_{i_L} z_{i_L}}$$

Equation 4 is a modified form of the Kohlrausch regulating function. When the conditions specified in the equation are satisfied, then substances $\alpha$ and $\gamma$ will migrate down the cylinder with equal velocity and the boundary between them will be maintained. If a molecule of $\alpha$ were to find itself in the bulk of solution L (where, from Equation 3, $L_L$ is less than $V_U$), it will migrate more slowly than the molecules of $\gamma$ (and therefore more slowly than the boundary), and will be overtaken by the boundary. Conversely, a molecule of $\gamma$ in the bulk of U will move faster than the boundary and will overtake it, thereafter migrating at the same velocity as the boundary. Let us now consider two solutions with one common ion $\beta$, and the two ions $\alpha$ and $\gamma$ with charge opposite to $\beta$.

From (4)

(5) $$\frac{m_\alpha x_\alpha}{c_\alpha m_\alpha z_\alpha + c_{\beta_U} m_\beta z_\beta} = \frac{m_\gamma x_\gamma}{c_\gamma m_\gamma z_\gamma + b_{\beta_L} m_\beta z_\beta}$$

The condition of net macroscopic electrical neutrality in each solution requires that, (6) $$c_\alpha z_\alpha = -c_{\beta_U} z_\beta \text{ and } c_\gamma z_\gamma = -c_{\beta_L} z_\beta$$

Therefore, from (5) and (6), (7) $$\frac{m_\alpha x_\alpha}{c_\alpha z_\alpha (m_\alpha - m_\beta)} = \frac{m_\gamma x_\gamma}{c_\gamma z_\gamma (m_\gamma - m_\beta)}$$

Let the *total concentration* of molecular species $i$, be (8) $$(I) = c_i x_i$$

then, (9) $$\frac{(A)}{(\Gamma)} = \frac{x_\gamma c_\alpha}{x_\alpha c_\gamma} = \frac{m_\alpha z_\gamma (m_\gamma - m_\beta)}{m_\gamma z_\alpha (m_\alpha - m_\beta)}$$

The relationship in this equation is relatively insensitive to temperature. Mobilities change with temperature mainly as a result of the sensitivity of the frictional resistance of the medium to temperature (the temperature coefficient of viscosity). Proportional changes in all mobilities cancel out in Equation 9.

From the Henderson-Hasselbalch equation for pH, where $$pH = pK_a + \log_{10} c_i/(iH)$$

where $iH$ is an acid, and $$pH = (14 - pK_b) + \log_{10}(i)/c_i$$

where $i$ is a base, and from (8), (10a)
$$x_\alpha = c_\alpha/(A) = c_\alpha/[c_\alpha + (\alpha H)] = 1/(1 + 10^{(pK_a - pH)})$$

(10b)
$$x_\beta = c_\beta/(B) = c_\beta/[c_\beta + (\beta)] = 1/(1 + 10^{-[(14-pK_b)-pH]})$$

Moving and stationary pH boundaries

If the pH of the lower solution is set so that the concentration of uncharged base is equal in both upper and lower solutions, then as the anionic boundary sweeps towards the anode (leaving uncharged base behind), the pH right behind the moving boundary will remain fixed and equal to the pH of the upper buffer (upper solution). This is achieved as follows:

Let $(\beta)_U = (\beta)_L$, then from the Henderson-Hasselbalch equation, (11) $\quad pH_U - (14 - pK_b) + \log_{10} c_{\beta_U} = pH_L - (14 + pK_b) + \log_{10} c_{\beta_L}$ Therefore, (12) $\quad pH_L = pH_U + \log_{10} c_{\beta_U}/c_{\beta_L}$ and from (6) and (8)

(13U) $\quad c_{\beta_U} = -x_\alpha(A) z_\alpha/z_\beta$ and (13L) $\quad c_{\beta_L} = -x_\gamma(\Gamma) z_\gamma/z_\beta$ Therefore, (14) $\quad pH_L = pH_U + \log_{10}(A) x_\alpha z_\alpha/(\Gamma) x_\gamma z_\gamma$ From (14) and (10a), $pH_L$ can be computed. From (10b) and (13L), (15) $\quad (B)_L = c_{\beta_L} + (\beta)_L = [-x_\gamma(\Gamma) z_\gamma/z_\beta](1 + 10^{-[(14-pK_b)-pH_L]})$ From (10b) and (13U), (16) $\quad (B)_U = [-x_\alpha(A) z_\alpha/z_\beta](1 + 10^{-[(14-pK_b)-pH_U]})$ If, in addition, we wished to set up a stationary pH boundary, with $pH_U$ above and $pH_U^*$ below which will remain at the original boundary between L and U, then $pH_U^*$, and $x_\alpha^*$ ($x_\alpha$ at $pH_U^*$), rather than $pH_U$ and $x_\alpha$ are used in calculating $pH_L$, and therefore $(B)_L$. When the potential is applied the pH of the solution above the original boundary will remain equal to $pH_U$, but the pH between that boundary and the moving boundary will equal $pH_U^*$.

Width of boundary

The concentration gradients of the individual components across the boundary between two discs during stacking will be a function of the difference in effective mobilities between the two components, the voltage gradients on each side, and the diffusion constants of each component.

Let us determine the width of the diffusion zone, measured from the plane of the boundary (were there no diffusion) to the edge of the diffusion zone.

If we consider the moving boundary in a coordinate system that moves with it, the diffusion of a molecule of component 1 into the region occupied by component 2, along the axis of the column can be described by Einstein's diffusion equation, $\bar{x}_2^2 = 2D_1 t$, where $\bar{x}_2$ is the root-mean square distance of migration of component 1 with diffusion constant D away from the boundary into the disc of component 2 along the axis in time $t$.

The velocity of migration due to diffusion alone is, therefore, (17) $\quad dx_2/dt = D_1/\bar{x}_2$ The apparent velocity of migration of a molecule of component 1 into the disc of component 2 (in the absence of diffusion) would be, (18) $\quad V_2(m_1 x_1 - m_2 x_2)$ (where, as before, $x_i$ is the degree of dissociation of the $i^{th}$ component).

We will define the edge of the diffuse zone as located at that distance from the plane of the boundary at which the two velocities are equal and opposite.

(19) $\quad D_1/x_2 = V_2(m_1 x_1 - m_2 x_2)$ and therefore, (20) $\quad \bar{x}_2 = D_1/V_2(m_1 x_1 - m_2 x_2)$
$\quad\quad = KT/Q_1 X_1 V_2(1 - m_2 x_2/m_1 x_1)$ and by symmetry, (21) $\quad \bar{x}_1 = D_1/V_1(m_2 x_2 - m_1 x_1)$
$\quad\quad = KT/Q_2 X_2 V_1(1 - m_1 x_1/m_2 x_2)$ since $m = QX/f$ (see mobility) and $$D = \frac{KT}{f}$$

where K is Boltzman's constant and T is the absolute temperature.

For industrial scale separations, it is of importance to know the cost of separation of two components in terms of the work necessary to accomplish the separation of a given amount of a pure substance as a function of its abundance ratio in the mixture, the differences in effective mobilities, and the minimum usable voltage gradient, using stacking (such as occurs in large-pore gels 12, 13, 33 and 34).

Work = (number molecules)(effective charge per molecule)(total distance of migration)(voltage gradient). The work to separate $n_1$ molecules of component 1 from a mixture with $n_2$ molecules of 2, where the abundance ratio of component 1, $r_1 = n_1/(n_1 + n_2)$ during stacking is (22) $\quad \text{Work} = (n_1/r_1)(Q_1 X_1)[2\bar{x}_1/r_1(1 - m_2 x_2/m_1 x_1)](V_1)$ therefore, $\quad \text{Work} = 2KT n_1 Q_1 X_1/r_1^2 Q_2 X_2(1 - m_2 x_2/m_1 x_1)^2$ If $r_1$ is initially less than 0.5, e.g. a relatively rare isotope, a more economical procedure will involve first arranging for the enrichment of component 1 by separation of pure component 2 so that there will be $l$ consecutive enrichment steps with a 50% yield of pure component 2 per step, and enrichment of 1 to about $r_1 = 0.5$ after $l$ steps. In order to avoid consumption of economically prohibitive amounts of electricity, the voltage gradient is increased sufficiently so that the length of the total layers times voltage gradient remains approximately constant. The work expended in this operation will be, (24) $\quad \text{Work} =$ $$2KT n_2 Q_2 X_2/Q_1 X_1 (1 - m_1 x_1/m_2 x_2)^2 \sum_{l=0}^{l=-\log_2(1-r_2)} 2l[2l(r_2-1)+1]^2$$

This latter calculation has not included the work expended in transporting the common ion, $\beta$, or any of the ions in the solutions ahead of and behind the two discs in question. It will usually be quite simple to keep the total work below 10 times the above value.

The following will provide a detailed mathematical basis for selecting the components and determining the concentrations of the acids and bases for the reservoir buffer solutions, the large-pore gel and the small-pore gel that are necessary to permit both the automatic concentrating step which results in separate but contiguous discs of sample ions as well as the subsequent spacing of these discs in an almost linear voltage gradient.

Given

Given (a) a pH range in which the net mobilities of the particular ions to be separated are all of like sign, and the largest absolute values of the mobility of the fastest and slowest ions are $m_{max}$ and $m_{min}$, respectively, and (b) the approximate final concentration (P), desired, during the concentration and separation of the components of the mixture into a stack of contiguous discs, in the disc of a particular ion of the set with mobility $m_p$ and net charge $z_p$.

To find

The "donor" acid or base (depending on whether the particular ion desired is negative or positive) providing the ion (fast, slow or common), must be soluble in water and reasonably compatible with the ions to be separated (e.g., potassium ion does not severely modify most proteins but mercuric ion precipitates many proteins).

Fast ion

The fast ion must have the same sign as the given ions to be separated and the product, $m_\gamma x_\gamma$, of its mobility $m_\gamma$ and its degree of dissociation, $x_\gamma$, must have a larger absolute value than $m_{max}$ at about 2 pH units below the given pH range if the ion is negative, and above, if the ion is positive.

Slow ion

If the given ions to be separated are negative, the slow ion must have a mobility, $m_a$, with an absolute value larger than $m_{max}$ and its acid must have a $pK_{a_a}$ 0 to 3 pH (preferred, 1.5) units above the middle of the given pH range.

If the given ions to be separated are positive, the slow ion must have a mobility with an absolute value larger than $m_{max}$ and its base must have a $(14-pK_{b_b})$ 0 to 3 pH units (1.5 preferred) below the middle of the given pH range.

Common ion

If the given ions to be separated are negative, the base of the common ion should have a $(14-pK_{b_b})$ preferably equal to the bottom of the given pH range, but no more than $\pm 1.5$ pH units difference.

If the given ions to be separated are positive the acid of the common ion should have a $pK_{a_a}$ preferably equal to the top of the given pH range, but no more than $\pm 1.5$ pH units difference.

Concentration fast ion "Donor"

(25) $$(\Gamma) = \frac{(P) m_\gamma z_D (m_D - m_\beta)}{m_D z_\gamma (m_\gamma - m_\beta)}$$

where the values for $m_\gamma$, $z_\gamma$, $m_\beta$ and $z_\beta$ have been chosen above and $(P)$, $m_D$, and $z_D$ are given in (b).

Concentration slow ion "Donor"

(26) $$(A) = \frac{(\Gamma) m_\alpha z_\gamma (m_\alpha - m_\beta)}{m_\gamma z_\alpha (m_\gamma - m_\beta)}$$

where the additional values for $m_\alpha$ and $z_\alpha$ have been chosen above.

Stacking $pH_U$

If the ions to be separated are negative, (27) $$pH_U = pK_{a_\alpha} - \log_{10}\left(\frac{y m_\alpha}{m_{min}} - 1\right)$$

where $y$ may have a value in the interval 1.0 to 10 (with a preferred value of 1.5).

If the ions to be separated are positive, (28) $$pH_U = (14 - pK_{b_\alpha}) + \log_{10}\left(\frac{y m_\alpha}{m_{min}} - 1\right)$$

Concentration common ion "Donor" in reservoir

If the ions to be separated are negative, (29) $$(B)_U = \frac{m_{min}}{y m_\alpha}(A)\frac{z_\alpha}{z_\beta}\left(1 + 10^{-[(14-pK_{b_\beta})-pH_U]}\right)$$

If the ions to be separated are positive, (30) $$(B)_U = \frac{m_{min}}{y m_\alpha}(A)\frac{z_\alpha}{z_\beta}\left(1 + 10^{+(pK_{a_\beta}-pH_U)}\right)$$

Concentration common ion "Donor" in large-pore gel

If the ions to be separated are negative, (31) $$(B)_{L_1} = \frac{-x_{\gamma_1}(\Gamma) z_\gamma}{z_\beta}\left(1 + 10^{-[(14-pK_{b_\beta})-pH_{L_1}]}\right)$$

where $$x_{\gamma_1} = \frac{1}{(1 + 10^{+(pK_{a_\gamma}-pH_{L_1})})}$$

where $pK_{a_\gamma}$ is determined by the choice in (a) above. where $$pH_{L_1} = pH_U + \log_{10}\frac{(A) m_{min}}{x_{\gamma_1}(\Gamma) y m_\alpha}$$

If the ions to be separated are positive, (32) $$(B)_{L_1} = \frac{-x_{\gamma_1}(\Gamma) z_\gamma}{z_\beta}\left(1 + 10^{+(pK_{a_\beta}-pH_{L_1})}\right)$$

where $$x_{\gamma_1} = \frac{1}{(1 + 10^{-[(14-pK_{b_\gamma})-pH_{L_1}]})}$$

where $pK_{b_\gamma}$ is determined by the choice in (a) above and where $$pH_{L_1} = pH_U - \log_{10}\frac{(A) m_{min}}{x_{\gamma_1}(\Gamma) y m_\alpha}$$

Gel pore sizes

The large-pore gel should have pore sizes which will give the value of $m_{min}$ in the gel equal to $m_{min}/y$. Tolerance on $m_{min}$ in gel, plus $$\frac{(y-1)\ 100\%}{2}$$

minus 0%.

Low concentrations of gel component give large pores and high concentrations give small pores. The proper pore size can be determined by trial and error.

The small-pore gel should have pore sizes which will cause the value of $m_{max}$ in the gel to be equal to $m_{max}/j$ where $j$ may have a value in the interval 1 to 10 (with $j$ approximately equal to 1.5 preferred). Tolerance on $m_{max}$ in gel, plus 0% minus $$\frac{(j-1)\ 100\%}{2}$$

The proper pore size can be determined by trial and error, but preferably 2 to 60% solids by weight where polyacrylamide is the gel (4 to 30% where proteins are to be electrophoresed).

Running pH in small-pore gel

If the ions to be separated are negative, (33) $$pH_U^* = pK_{a_\alpha} - \log_{10}\left(\frac{j \cdot m_\alpha}{m_{max}}\right) - 1$$

If the ions to be separated are positive, (34) $$pH_U^* = (14 - pK_{b_\alpha}) + \log_{10}\left(\frac{j \cdot m_\alpha}{m_{max}} - 1\right)$$

Concentration common ion "Donor" in small-pore gel

If the ions to be separated are negative, (35) $$(B)_{L_2} = \frac{-x_{\gamma_2}(\Gamma) z_\gamma}{z_\beta}\left(1 + 10^{-[(14-pK_{b_\beta})-pH_{L_2}]}\right)$$

where $$x_{\gamma_2} = \left(\frac{1}{1 + 10^{+(pK_{a_\gamma}-pH_{L_2})}}\right)$$

and where $$pH_{L_2} = pH_U^* + \log_{10}\frac{(A) m_{min}}{x_{\gamma_2}(\Gamma) y m_\alpha}$$

If the ions to be separated are positive, (36) $$(B)_{L_2} = \frac{x_{\gamma_2}(\Gamma) z_\gamma}{z_\beta}\left(1 + 10^{(pK_{a_\beta}-pH_{L_2})}\right)$$

where $$x_{\gamma_2} = \left(\frac{1}{1 + 10^{-[(14-pK_{b_\gamma})-pH_{L_2}]}}\right)$$

and where $$pH_{L_2} = pH_U^* + \log_{10} \frac{(A)m_{min}}{x_{\gamma_2}(\Gamma)ym_\alpha}$$

These various equations hereinbefore can be easily extended to also cover polyvalent weak acids and bases. Maximum permissible error in preparing specified concentrations, $$(B)_{L_2} \text{ plus } \frac{(10-j)100\%}{2}, \text{ minus } \frac{(j-1)100\%}{2}$$

and for $$(\Gamma)_2, \text{ minus} \frac{(10-j)(B)_{L_2}}{2}, \text{ plus } \frac{(j-1)(B)_{L_2}}{2}$$

Maximum permissible error in preparing specified concentrations, $$(B)_{L_1}, \text{ plus} \frac{(y-1)100\%}{2}, \text{ minus } \frac{(10-y)100\%}{2}$$

and for $$(\Gamma)_1 \text{ minus } \frac{(y-1)(B)_{L_1}}{2}, \text{ plus } \frac{(10-y)(B)_{L_1}}{2}$$

Maximum permissible error in preparing specific concentrations, $(B)_U$ for the upper buffer solution is without limit, provided that the pH of this solution does not exceed the given pH range in (a) by plus four units for anionic separations or minus four units for cationic separations. Maximum permissible error for prepaing (A) for the lower buffer solution is without limit, provided that the pH of this solution does not exceed the given pH range in (a) by minus four units for anionic separations or plus four units for cationic separations. Maximum permissible error in preparing specific concentration $(B)_U$ for the lower buffer solution, or (A) for the upper buffer solution is equal to minus $$\left(1/2 - \frac{V_t}{V_{\gamma_L}}\right)(B)_U$$

or minus $$\left(1/2 - \frac{V_t}{V_{\gamma_U}}\right)(A)$$

plus no limit, where $V_t =$ the total internal volume of the gel containers (11) used in a single run, and $V\gamma_U$ and $V\gamma_L$ are the volumes of upper and lower buffers used.

For the purpose of illustrating how Equation 9 can be used to produce thin starting zones, $\alpha$ will be the glycinate ion, $\beta$ the potassium ion, and $\gamma$ the chloride ion. Then, $z_\alpha = -1$
$z_\gamma = -1$
$m_\alpha = -15$ mobility units
$m_\beta = +37$ mobility units
$m_\gamma = -37$ mobility units and therefore, $$(\text{glycine})/(\text{chloride}) = (A)/(\Gamma) = 0.58$$

(essentially independent of pH of either solution from pH 4 to pH 10, within which range, neither the hydrogen nor hydroxyl ions will appreciably contribute to conductivity, provided that the chloride concentration is greater than $10^{-3}$ M).

Above pH 8.0, most serum proteins have free mobilities in the range from $-0.6$ to $-7.5$ units. If the effective mobility of glycine, $m_\alpha x_\alpha$, were less than $-0.6$, the mobilities of the serum proteins would fall between that of the glycine and that of chloride. This requirement is satisfied when $x_\alpha = \frac{1}{30}$ since the glycinate ion has a mobility of $-15$ units. The pH at which this degree of dissociation of glycine occurs, can be calculated (Equation 10a).

$$pH = pK_a - \log_{10}[(1/x_a) - 1]$$

Therefore, the pH of the glycine solution must be 8.3 if $x_a = \frac{1}{30}$.

If a protein molecule with a mobility of $-1.0$ units is placed in the glycine solution (pH 8.3) one centimeter above the glycine-chloride boundary, by the time the boundary (or a glycine molecule) has migrated one centimeter, the protein will have migrated two centimeters and will then be located at the boundary. It would continue to run at the boundary because the mobility of the chloride is greater than that of the protein.

If, a very large number of albumin molecules (mobility approximately $-6.0$ units), are placed in the glycine solution (pH 8.3), they will concentrate at the boundary between the chloride and the glycine at a concentration satisfying Equation 9) where $\alpha$ is now the serum albumin, $\beta$, the potassium ion, and $\gamma$, the chloride ion. Then, $z_\alpha = -30$ (approx. charge of albumin molecule at pH 8.3)
$z_\gamma = -1$
$m_\alpha = -6.0$ mobility units
$m_\beta = +37$ mobility units
$m_\gamma = -37$ mobility units and therefore (albumin)/(chloride) $= 9.3 \times 10^{-3}$. If (chloride) $= 0.06$ M, then (albumin) $= 0.00056$ M. That is, the albumin (M.W. 68,000) will automatically concentrate to about 3.8% behind the chloride, and would then stay at constant concentration. If the initial concentration of albumin had been 0.01% in the glycine buffer, and if 1 milliliter of this mixture is placed on top of the chloride solution in a cylinder of one square centimeter cross-section, then after the chloride boundary has moved about one millimeter, all of the albumin will have concentrated into a disc (right behind the chloride) which would be about 25 microns thick. (In practice, this might be done by using a porous anticonvection medium all through the volume occupied by the chloride and through the one centimeter height of the glycine column). In this manner, a 380-fold increase in concentration can be achieved in a few minutes and the protein is reduced to a very thin lamina or disc. If the original concentration had been 0.0001%, the same final concentration would result, but the total change would now be 38,000-fold. If the column were 100 cm. in length, the same amount of protein would have been concentrated.

If, instead of a single protein, a one milliliter mixture with mobilities ranging from $-1.0$ to $-6.0$ units is placed over the chloride solution, by the time the boundary has migrated one centimeter in the applied electric field, all the proteins will have concentrated into very thin discs, one stacked on top of the other in order of decreasing mobility, with the last followed immediately by glycine.

If the boundary (and the following stack of discs) is permitted to pass into a region of higher pH, e.g., a pH of 9.8 (the $pK_a$ of glycine), at which $x_{gly}$ equals $\frac{1}{2}$ and therefore $m_{gly}x_{gly}$ equals $-7.5$ mobility units, the glycine will now overrun all the protein discs and run directly behind the chloride, and the proteins will now be in a uniform linear voltage gradient, each effectively in an extremely thin starting zone, and will migrate as in "free electrophoresis." The required stationary pH boundary is quite easily established (see Moving and Stationary pH Boundaries) subject to degradation only by diffusion.

An electrophoretic matrix can be prepared into which discontinuities in pH and gel pore sizes as well as Kohlrausch conditions are incorporated.

At some time after stacking is complete (this time depending on the thickness of the spacer gel) the proteins reach the small-pore gel where changes in their mobilities occur. Because of the special viscous properties of the gel, proteins of equal free mobility but of appreciably different molecular weight (different diffusion constant) will migrate with markedly different mobilities and will easily be separated. A 7½% acrylamide gel has proven to effect useful separations of human serum proteins. The fastest pre-albumin has a mobility less than −5.0 units in such a gel. We, therefore, arrange for a "running pH" of about 9.5 where the effective mobility of glycine ($m_{gly}x_{gly}$) is about −5.0 units in the gel.

Given the concentration of chloride, ($\Gamma$), and the pH of the upper buffer as 8.3, it is possible to compute from Equations 9, 10a and 14 the concentration of glycine (A), and the proper pH, $pH_{L_1}$ for the large-pore gel (3%) and $pH_{L_2}$ for the small-pore gel (7½%). In calculating $(B)_{L_2}$ and $pH_{L_2}$, a $pH_U^*$ of 9.5, the "running pH," and $x_a^* = \frac{1}{3}$ (the value of $x_a$ at $pH_U^*$), rather than 8.3 and $\frac{1}{30}$ are used in Equations 14 and 16 in order to program the desired pH change. The particular base used will usually be chosen so that $(14-pK_b)$ falls between $pH_{L_1}$ and $pH_{L_2}$ in order to provide some buffering action in the lower solutions. The concentration of base $(B)_U$, for the upper buffer (which is also identical to the buffer used in the lower electrode reservoir) and the concentration of base for the large-pore gel, $(B)_{L_1}$ and the small-pore gel, $(B)_{L_2}$ are computed from Equations 15 and 16.

Thus the thin starting zones plus the sieving effect of the gel together provide high resolution. The "pre-concentrating" step, permitting the use of extremely dilute samples is an extra bonus.

We claim:
1. An electrophoretic process for simultaneously separating and concentrating various components of a mixture of like sign-charged particles comprising placing said mixture in an anticonvection medium, applying a potential across said medium, providing behind said particles a weak buffer ion carrying said like sign, providing a second ion carrying said like sign within said medium, and providing a pH environment within said medium whereby said buffer ion will remain behind the slowest of said component particles and said second ion will precede the fastest of said component particles.

2. An electrophoretic process for simultaneously separating and concentrating a mixture of various kinds of particles of like sign of net charge comprising
dissolving said mixture in a polar solvent,
providing an anticonvection first medium,
applying a potential across said medium between a first electrode of like sign-charge and a second electrode of opposite sign-charge respectively so that said particles will travel from said first electrode and toward said second electrode,
placing said dissolved mixture between said first electrode and a point spaced inwardly from the end of said medium nearest said second electrode,
providing a weakly-ionized first substance between said electrodes,
providing an ionized second substance contiguous to said first substance between said second electrode and said first substance, and at least in part of said medium, said second substance having a second ion of said like sign with a higher effective mobility in said medium than the highest particle mobility and with greater concentration than said particles solution concentration,
and providing a weakly-ionized third substance within the region occupied by said second substance having a third ion of said opposite sign,
said three substances and concentrations of said first and said third substances selected so that the degree of dissociation of said first substance will provide said first ion with a lower effective mobility in said medium than the lowest particle mobility,
whereby in said medium,
said first ions will migrate contiguous to and behind said lowest mobility particles,
said particles will separate into said various kinds and migrate in successive contiguous layers in accordance with the relative mobility of said various kinds,
said second ions will migrate contiguous to and preceding said highest mobility particles,
all like sign ions and all said particles will separate and migrate in contiguous layers at equal speeds,
the concentrations of said particles in said separate and contiguous layers will exceed the original particles concentration by a factor related to the concentration ratio of said second ion to said original particles,
the thickness of each kind of contiguous particles layer will be proportional to the amount of each various kind of particles in said original mixture,
and the resulting decrease toward said second electrode in potential gradient across each boundary between said contiguous layers limits the spreading of said boundaries between said layers that would otherwise occur as the result of thermal diffusion, thereby maintaining separation and purity of said various kinds independent of the electrophoretic running time in excess of that necessary to form said contiguous layers.

3. The process of claim 2 wherein said various kinds of particles are ions containing different isotopes of the same chemical element.

4. The process of claim 3 wherein a separated layer of one kind of particles is removed before all of said one kind of particles have separated from the other of said particles, and the product of said potential per unit length multiplied by the length of said layers along the axis of migration is maintained approximately constant.

5. The process of claim 4 wherein said removal is continuous.

6. The process of claim 4 wherein said removal is intermittent.

7. The process of claim 2 wherein said polar solvent is water.

8. The process of claim 7 wherein a controllable molecular-sieving anticonvection second medium is positioned between said first medium and said second electrode and contiguous to said first medium, providing said weakly-ionized third substance in said second medium, the pore size of said sieving medium being such to reduce the mobility in said second medium of said highest mobility particles to a value below that of said first ion in said second medium, whereby said contiguous particle layers will become spaced layers in said second medium.

9. The process of claim 8 wherein said first medium is also a controllable molecular-sieving medium.

10. The process of claim 7 wherein an anticonvection second medium is positioned between said anticonvection first medium and said second electrode and contiguous to said first medium, providing said weakly-ionized third substance in said second medium in such greater concentration than in said first medium that in said second medium the effective mobility of said first ion will be higher than that of said highest mobility particles in said second medium whereby said contiguous particle layers will become spaced layers in said second medium.

11. The process of claim 10 wherein said second medium is a controllable molecular-sieving medium.

12. The process of claim 10 wherein both said media are controllable molecular-sieving media.

13. The process of claim 7 wherein said mixture includes a plurality of proteinaceous components.

14. The process of claim 13 wherein said mixture is a pituitarly hormone extract.

15. The process of claim 13 wherein said mixture is blood serum.

16. The process of claim 12 wherein said mixture is blood serum.

17. The process of claim 16 wherein said first substance is glycine, said second substance is hydrochloric acid, and said third substance is 2-amino-2(hydroxymethyl)-1-3-propanediol.

18. The process of claim 17 wherein said media contains polyacrylamide.

19. The process of claim 18 wherein said first medium is about 2½% polyacrylamide and said second medium is about 7½% polyacrylamide.

20. The process of claim 19 wherein before applying said potential said first medium has a pH of about 6.7 and said second medium has a pH of about 8.9.

21. In an electrophoretic process for separation of a mixture of like sign-charged particles, the improvement comprising running said mixture through a two-stage medium, each having a different environment, said first stage having a first combination environment of pore size, pH and ions to concentrate and separate said components into contiguous layers and said second stage having a second combination environment of pore size pH and ions to space said contiguous layers.

References Cited

Barka: The Journal of Histochemistry and Cytochemistry, "Studies of Acid Phosphatase, Electrophoretic Separation of Acid Phosphatase of Rat Liver on Polyarcylamide Gels," vol. 9, No. 5, 1961, pp. 542–547.

Evans et al.: Archives of Biochemistry and Biophysics, "Zone Electrophoresis of Conarachin, α-Conarachin and Bovine Serum Albumin on Polyacrylamide Gel," vol. 96, No. 2, February 1962, pp. 233–239.

Raymond et al.: II, Science, "Acrylamide Gel as a Supporting Medium for Zone Electrophoresis," vol. 130, No. 3377, September 1959, p. 711.

Zingale et al: Medicina (Buenos Aires), "Polyacrylamide Gel in the Electrophoresis of Serum Proteins," vol. 21, (1961), pp. 121–129.

Heftman: Chromatography, pp. 229–234, pp. 262–266, 387–396, 328–343, 1961.

Raymond et al.: I, Analytical Biochemistry, "Preparation and Properties of Acrylimide Gel for Use in Electrophoresis," volume 1, 1960, pp. 391–396.

Ferris et al.: American Journal of Clinical Pathology, vol. 38, October 1962, pp. 383–387, 204–180G.

Lederer: Chromatographic Reviews, volumes 1–4, 1959–62.

Ferres et al.: Blood, "Hemoglobin Electrophoresis in Arcylimide Gel," vol. 19, April 1962, pp. 479–481.

JOHN H. MACK, *Primary Examiner.*

HOWARD S. WILLIAMS, *Examiner.*

G. E. BATTIST, E. ZAGARELLA,
*Assistant Examiners.*